United States Patent Office 3,393,243
Patented July 16, 1968

3,393,243
PROCESS OF PREPARING POLYOXYPROPYLENE POLYETHER POLYOLS
Michael Cuscurida, Austin, Tex., assignor to Jefferson Chemical Company, Inc., Houston, Tex., a corporation of Delaware
No Drawing. Filed Sept. 24, 1964, Ser. No. 399,083
3 Claims. (Cl. 260—615)

ABSTRACT OF THE DISCLOSURE

Polyoxypropylene polyether polyols of an equivalent weight of about 1,500 to 2,500 having reduced terminal unsaturation can be prepared by the propoxylation of a polyoxypropylene polyether polyol intermediate having equivalent weight of from about 150 to about 750 when the propoxylation is conducted in the presence of cesium hydroxide.

---

This invention is concerned with the preparation of improved high molecular weight polyethers. More particularly, this invention is concerned with the preparation of propylene oxide based high molecular weight polyethers suitable for polyurethane applications and having reduced terminal unsaturation.

It is well known to prepare polyethers for polyurethane applications by the base catalyzed reaction of propylene oxide with an initiator containing two or more reactive hydrogen atoms. Such initiators include, for example, propylene glycol, glycerine, trimethylolpropane, 1,2,6-hexanetriol, pentaerythritol, sorbitol, methyl glucoside, sucrose, triethanolamine, ethylenediamine and aminoethylpiperazine. The alkaline catalysts normally employed are sodium hydroxide and potassium hydroxide.

Polyether polyols having equivalent weights of up to about 750 are normally prepared in a one-step process by the reaction of propylene oxide with such an initiator. For the preparation of larger molecules, a two-step process is employed. In the first step, a product having an equivalent weight of from about 150 to about 750 is prepared, and in the second step this is reacted further with propylene oxide to prepare the higher molecular weight product.

In the base catalyzed addition of propylene oxide to compounds having active hydrogen groups, the growing polyether chains are terminated predominantly with secondary hydroxyl groups. These secondary hydroxyl groups have a tendency to dehydrate to give a polyether chain terminated by olefinic unsaturation, thus stopping the growth of that chain. A high terminal unsaturation is undesirable in polyethers to be used in the preparation of polyurethanes. Since unsaturation results through loss of hydroxyl groups, high unsaturation means fewer sites for reaction with the isocyanate.

Heretofore, polyethers having acceptably low terminal unsaturation have been obtainable with equivalent weights of up to about 1000. However, attempts to prepare larger molecules, for example, those having equivalent weights of about 2000, have resulted in products having unacceptably high terminal unsaturation.

I have now surprisingly discovered that polyether polyols having equivalent weights of from about 1500 to about 2500 can be prepared with acceptable terminal unsaturation values by the use of cesium hydroxide as the propoxylation catalyst. Such products are obtained by the reaction at about 50° to about 150° C. of propylene oxide with an intermediate polymer having an equivalent weight of from about 150 to about 750 in the presence of from about 0.5 to about 5 wt. percent of cesium hydroxide based on the weight of intermediate polymer employed as initiator. At the completion of the reaction the cesium hydroxide catalyst is neutralized with an acid and the salts formed are removed by filtration. The terminal unsaturation of products having equivalent weights of about 1500 to about 2500 are 30–50% less than the terminal unsaturation of equivalent products prepared using the prior art alkaline catalysts.

In accordance with my invention, the reaction is conducted at a temperature within the range of about 50° to about 150° C., preferably within the range of about 100° to about 125° C. Since propylene oxide is a gas at these temperatures, the reaction is normally conducted in a closed system at a pressure within the range of about 30 to about 100 p.s.i.g. From about 0.5 to about 5%, preferably 1–2%, of cesium hydroxide is employed based on the weight of intermediate polyether polyol initiator used.

The cesium hydroxide catalyst of my process may be neutralized at the completion of the reaction in accordance with prior art procedures well known to those skilled in the art. Acids that may be employed include, for example, phosphoric acid, acetic acid, sulfuric acid, carbon dioxide and solid organic acids as described in United States Patent No. 3,000,963.

The initiator for my process may be obtained by the reaction of propylene oxide with a compound having two or more reactive hydrogen atoms as described hereinabove. Sufficient propylene oxide should be reacted with such compound to give a polyether polyol having an equivalent weight of from about 150 to about 750. It is not necessary that cesium hydroxide be employed as the catalyst for the preparation of the intermediate polyether polyol. However, cesium hydroxide may be employed as the catalyst for this step, as may prior art alkaline propoxylation catalysts such as sodium hydroxide and potassium hydroxide.

My invention will be further illustrated by the following specific examples which are given as illustrations only and are not intended to place limitations on the invention.

Example I

Into a 10-gallon reaction kettle were charged 15 pounds of a polypropylene glycol having an equivalent weight of 500 and 204 grams of 50% aqueous cesium hydroxide solution (1.5% based on the weight of initiator). The reactor was thoroughly purged with an inert gas and heated to 100° C. The reaction charge was then dewatered, first by vacuum stripping to minimum pressure and then stripping with an inert gas at 300 mm. pressure. Sixty-four pounds of propylene oxide was then added at 110°–115° C. at a pressure of 60 p.s.i.g. The addition required approximately 10 hours. The reaction mixture was then digested for 2–3 hours to reach an equilibrium pressure and was neutralized with 80 grams of oxalic acid dispersed in 240 grams of water. An antioxidant and a filter aid were added, and the neutralized product was vacuum stripped to minimum pressure at 110° C., gas stripped with an inert gas at 300 mm. for one hour and filtered at 110–120° C. The product had the following properties:

Hydroxyl no., mg. KOH/g. _____ 29.3
Eq. wt. (based on hydroxyl no.) _____ 1915.0
Unsaturation, meq./g. _____ 0.07
Water, wt. percent _____ 0.02
pH in 10:1 methanol-water _____ 5.5

Example II

Example I was repeated with the exception that potassium hydroxide was employed in place of cesium hydroxide. The product had the following properties:

| | |
|---|---|
| Hydroxyl no., mg. KOH/g. | 31.6 |
| Eq. wt. (based on hydroxyl no.) | 1780.0 |
| Unsaturation, meq./g. | 0.11 |
| Water, wt. percent | 0.014 |
| pH in 10:1 methanol-water | 5.5 |

Even though the product prepared in Example I had a somewhat higher equivalent weight than that prepared in Example II, the unsaturation of the product of Example I was considerably below that of the product from Example II. Such a difference is wholly unexpected.

In general, it may be said that my process for the preparation of propylene oxide based polyether polyols may be advantageously employed for the preparation of polyether polyols having equivalent weights above about 1500. My process shows no particular advantage over prior art processes for the preparation of polyether polyols having equivalent weights below about 1500, and it is only in the preparation of products having equivalent weights above about 1500 that the remarkable results described herein are obtained.

Having thus described my invention, what is claimed is:

1. In a method for preparing a propylene oxide based polyether polyol having an equivalent weight of from about 1500 to about 2500 by the reaction at a temperature of from about 50° to about 150° C. of propylene oxide with an intermediate polyoxypropylene polyether polyol having an equivalent weight of from about 150 to about 750 in the presence of an alkaline catalyst, the improvement for reducing the terminal unsaturation of the product which comprises employing as catalyst from about 0.5 to about 5 wt. percent of cesium hydroxide based on the weight of intermediate polyether polyol initiator used.

2. A method as in claim 1 wherein the reaction temperature is within the range of from about 100° to about 125° C., the equivalent weight of the intermediate polyether polyol is about 500 and the amount of cesium hydroxide employed is from about 1–2 wt. percent based on the weight of intermediate polyether polyol.

3. A method as in claim 2 wherein the intermediate polyether polyol is a polypropylene glycol.

References Cited
UNITED STATES PATENTS

| | | | |
|---|---|---|---|
| 2,652,424 | 9/1953 | DeGroote | 260—615 XR |
| 3,016,404 | 1/1962 | Beauchamp et al. | 260—615 |
| 3,030,425 | 4/1962 | Mills et al. | 260—615 XR |
| 3,053,903 | 9/1962 | Holland | 260—615 |
| 3,117,998 | 1/1964 | Cosby et al. | 260—615 XR |

FLOYD D. HIGEL, *Primary Examiner.*